July 21, 1931. G. P. McGRAW 1,815,721
METHOD OF AND APPARATUS FOR MANUFACTURING ARTICLES
Filed March 6, 1929
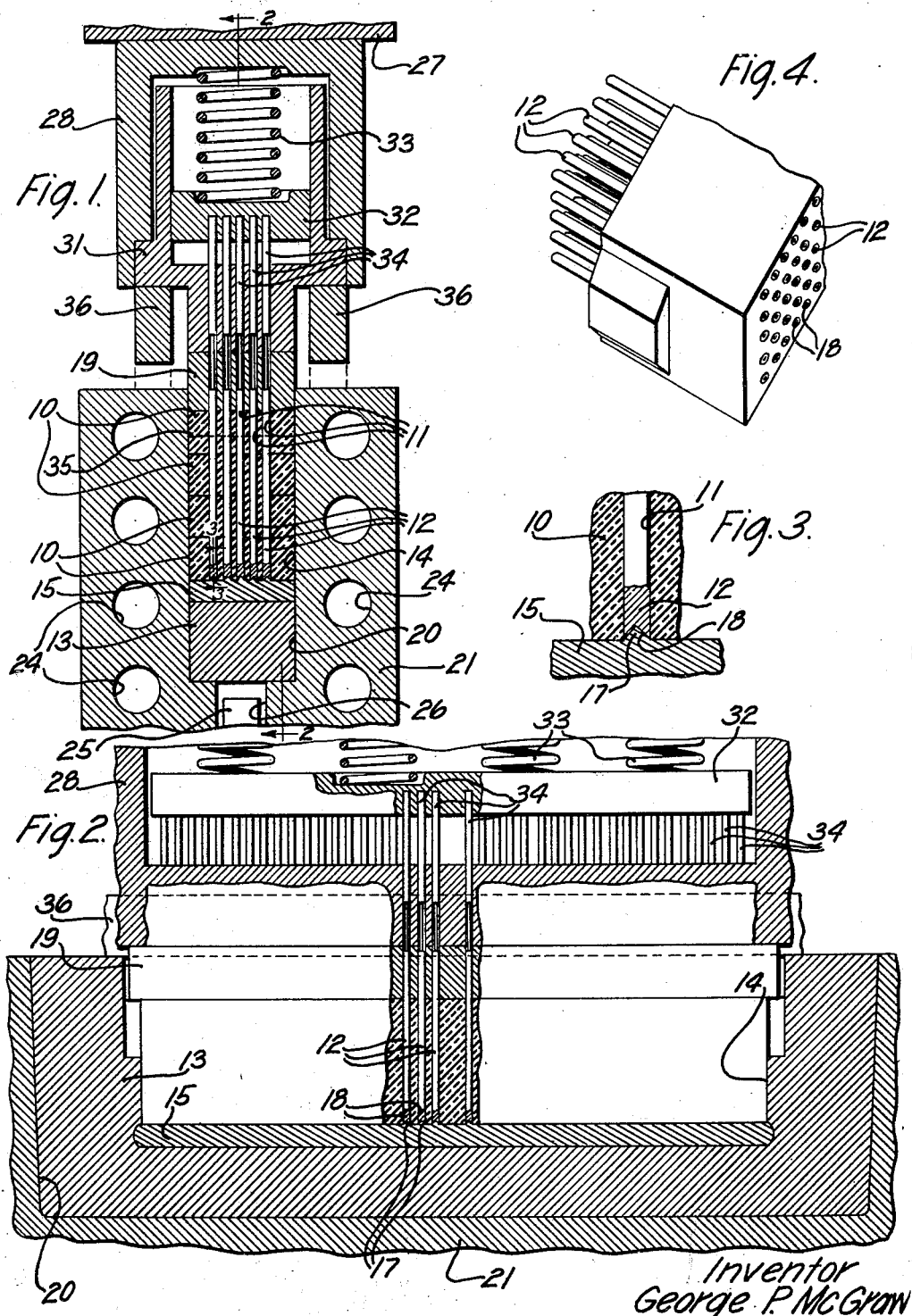
Inventor
George P. McGraw
By [signature] Atty.

Patented July 21, 1931

1,815,721

UNITED STATES PATENT OFFICE

GEORGE POLLOCK McGRAW, OF DOWNERS GROVE, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR MANUFACTURING ARTICLES

Application filed March 6, 1929. Serial No. 344,827.

This invention relates to methods of and apparatus for manufacturing articles, and more particularly to methods of and apparatus for molding composite articles having a plurality of inserts.

In some cases it is desirable to mold articles having a large number of independent, separated inserts extending therethrough; for example, "test strips" used in connection with telephone switchboards. Test strips of this character may include 200 closely spaced metal inserts molded into a block or strip, the inserts having terminal or contact portions at each end, with one end projecting from one side of the strip and the other end flush with the opposite side thereof. One method which has been used in molding strips of this type is to position the inserts in the mold in spaced relation and force a quantity of molding composition; for example, a phenolic plastic composition, around the assemblage of inserts by the application of pressure and heat, the pressure being exerted laterally of the inserts, which in some instances, due to the great pressure used, may tend to deform or displace the inserts in the completed strip and cause short circuits therebetween.

The objects of this invention are to provide an improved method of and apparatus for maintaining separate, independent inserts in predetermined positions previous to, during the insertion of and in a subsequent molding of a material therearound.

In order to obtain these and other objects in accordance with the general features of the invention, slightly oversized, preformed and partially cured charges of phenolic plastic composition are prepared and formed with oversized apertures predeterminedly arranged to receive the inserts. The assemblage of charges and inserts is thereafter inserted in a molding apparatus which is provided with predeterminedly arranged projecting elements equal in number to and alignable with the inserts with counterbored inner ends of the inserts resting on the projecting elements, the outer ends of the inserts extending from a surface of the charges. An apertured pressure cap is then placed in the molding cavity and in abutting relation with the outer end surface of the charges, with the inserts extending through the apertures of the cap. Resiliently mounted pins serve to hold the inserts firmly in position with the counterbored ends thereof resting on the elements in the molding cavity during the compressing of the phenolic plastic charges to an accurate dimension upon the application of heat and pressure to cure completely the charges into a unitary article.

Other objects and advantages of this invention will more fully appear from the following description taken in connection with the accompanying drawings, wherein Fig. 1 is a fragmentary vertical sectional view of a molding apparatus embodying features of the invention, the parts being in position to begin a molding operation;

Fig. 2 is a slightly reduced fragmentary vertical sectional view taken on the line 2—2 of Fig. 1, the parts being shown in the position they assume at the completion of the molding operation;

Fig. 3 is an enlarged fragmentary detail vertical sectional view taken on the line 3—3 of Fig. 1, and Fig. 4 is a fragmentary perspective view of a composite article produced by the method and apparatus of this invention.

Referring now to the drawings in detail wherein like reference numerals refer to similar parts throughout the drawings, the method of this invention as applied to the molding, for example, of "test strips" hereinbefore referred to, may be carried out by first providing a plurality of similarly dimensioned preformed and partially cured sections or charges 10 of phenolic plastic composition, which are prepared by molding or otherwise and formed with slightly oversized apertures 11 predeterminedly arranged to receive the required number of metal inserts in the form of circular pins 12. A plurality of sections 10 forming a stack or charge, the overall height of which is predeterminedly slightly greater than that of the finished article and having substantially the same length and breadth thereof with the required number of pins 12 threaded therethrough is positioned in a U-shaped loading fixture 13, which when in position for the molding operation provides opposite end walls and the floor of a molding cavity 14 (Fig. 2). The upper surfaces of the horizontally extending portion of the fixture 13 forming the floor of the molding cavity 14 is in the form of a hardened steel insert 15 provided with predeterminedly arranged projecting elements which may be in the form of inserts or integral portions as shown in the drawings formed upon the fixture, equal in number to and alignable with the pins 12 mounted in the apertures 11 of the charge of sections 10. The lower flat end surfaces of the pins are counterbored as indicated in detail by the numeral 18 (Fig. 4) and into which the projecting portions 17 of the fixture 13 extend, the pins resting thereon and thus are interlocked with the floor of the cavity 14 to prevent lateral displacement during the subsequent molding by pressure and heat of the charge of sections 10 around the pins 12. A pressure cap 19 provided with a number of accurately arranged apertures corresponding to the pins 12 and aligned therewith is then placed in the fixture 13 and resting upon the upper surface of the stack or sections 10 the upper ends of the pins extending only into the lower portions of the apertures of the cap, as clearly shown in Fig. 1. The cap 19, it will be apparent, in addition to serving as an intermediate pressure member also serves to maintain the upper ends of the pins 12 in a predetermined lateral position, which together with the interlocking of the lower ends thereof, previously referred to, provides for maintaining the pins in a predetermined separated position in the fixture 13 previous to and during the insertion thereof into a molding position.

The fixture 13 loaded with the charge of sections 10 and the inserts 12 and with the pressure cap 19 positioned in the manner previously described is then placed in a pocket 20 of a mold body or chase 21 provided with the usual heating and cooling channels or coils 24. The purpose of using a plurality of preformed partially cured sections 10 of phenolic plastic composition is to restrict as much as possible the flow of the composition during the molding operation, thereby minimizing the probability of shifting the insert pins 12 out of position. The opposite longitudinally extending walls of the mold pocket 20 (Fig. 1) provide side walls disposed at right angles to the end walls provided by the fixture 13 previously referred to, thus completing the molding cavity 14. The fixture 13 snugly fits within the pocket 20 and the abutting outer and inner end surfaces of the fixture and the pocket 20 of the chase 21, respectively, are tapered slightly (Fig. 2) to facilitate the removal of the fixture from the pocket 20 upon completion of the molding of the article. Although the abutting outer and inner side surfaces of the fixture 13 and the pressure cap 19 and the pocket 20 of the chase 21, respectively, as viewed in Fig. 1, are not shown tapered, it will be apparent that they may also be tapered for the same purpose for which the end surfaces, previously referred to, are tapered. A plurality of knock-out pins 25 extend into apertures 26, one of which is shown in Fig. 1, provided in the lower horizontal wall of the pocket 20 of the chase 21 and actuated (by means not shown) serve to raise the fixture 13 upon completion of the molding of the article to facilitate the removal of the fixture from the pocket 20.

In the embodiment of the molding apparatus shown in the drawings the chase 21 serves as a base plate or a stationary pressure member, while an upper movable pressure member or ram 27 is positioned thereabove and which may be hydraulically actuated or otherwise. Fixed to the lower surface of the ram 27 is a hollow holder plate 28 with an opening in the lower end thereof capped by a shouldered hollow insert 31 which fits a complementary shoulder of the plate and is suitably fixed thereto. Reciprocably mounted within the hollow of the insert 31 is a plate 32 with a plurality of compression springs 33 bearing at opposite ends thereof against the opposed surfaces of the holder plate 28 and the reciprocable plate 32 (Fig. 1), thus providing a resilient mounting for the latter. The plate 32 is equipped with a number of fixed depending pressure pins 34 corresponding to the apertures in the pressure cap 19 and the pins 12 and aligned therewith, which ride in apertures formed in the insert 31. The ram 27 with the attached holder 28 is shown in Fig. 1 in a partly lowered position ready to begin the molding operation, but it is to be understood that in its normal position it is elevated above the chase 21 sufficiently to permit the loaded fixture 13 to be freely lowered into position in the molding cavity 14. The lower ends of the pins 34 are slightly reduced in diameter so that they may freely enter the apertures provided in the pressure cap 19 when the ram 27 is lowered and thereby engage the upper end surfaces of the insert pins 12.

It will be apparent during the molding operation as the ram 27 descends and the pressure of the cap 19 upon the phenolic plastic charge or sections 10 reduces the height thereof as the sections soften, due to the heat applied simultaneously with the pressure through the channels 24 to the final height indicated by the broken line 35, that the resiliently mounted pressure pins 34 bearing against the insert pins 12 will serve to continually hold them in a predetermined longitudinal position with their lower ends interlocked with the floor of the molding cavity 14, as hereinbefore described, to prevent them shifting laterally. Pads 36 fixed to a lower surface of the insert 31 carried by the holder 28 limit the downward movement of the ram 27 and thus determine the final accurate height of the finished article, as clearly shown in Fig. 2. Upon the continued application of heat to the phenolic plastic charge of sections 10 through the channels 24 for a predetermined period after the pads 36 have come to a stop against the chase 21, the sections 10 are completely cured into a unitary article having the insert pins 12 molded therein in a predetermined position.

While the method and apparatus of this invention has been disclosed and described in connection with a particular article, it will be understood that the invention is capable of application to other types of articles and is only limited by the scope of the appended claims.

What is claimed is:

1. The method of manufacturing composite articles, comprising a body portion of moldable material with an insert, which consists in positioning an apertured charge of partially molded material of a certain volume in a molding position, with an insert in the aperture of the charge, and then molding the charge with the insert supported therein into a unitary composite article of predetermined accurate dimensions and relationship of the insert with the body portion.

2. The method of manufacturing composite articles, comprising a body portion of cured moldable composition with an insert, which consists in placing in a molding position an apertured charge of partially cured composition of a certain volume, with an insert in the aperture of the charge, maintaining the insert in a predetermined position, and then molding the charge with the insert supported therein into a unitary completely cured composite article of predetermined accurate dimensions and relationship of the insert with the body portion.

3. The method of manufacturing composite articles, comprising a body portion of a cured moldable composition with an insert, which consists in placing in a molding position an apertured charge of partially cured composition having certain dimensions, with an insert in the aperture of the charge, securing the insert against longitudinal and lateral displacement, and then molding the charge with the insert supported therein into a unitary completely cured composite article of predetermined accurate dimensions and relationship of the insert with the body portion.

4. The method of manufacturing composite articles, comprising a body portion of a cured moldable composition with an insert, which consists in positioning an apertured sectional charge of partially cured composition of a certain volume in a molding cavity, with the insert in the aperture of the charge, maintaining by pressure the insert in a predetermined longitudinal position in the molding cavity and abutting the floor thereof, interlocking the abutting surfaces of the insert and the floor cavity to prevent lateral displacement of the insert, and then molding the charge with the insert supported therein into a unitary completely cured composite article of predetermined accurate dimensions and relationship of the insert with the body portion.

5. The method of manufacturing composite articles, comprising a body portion of cured moldable composition having a plurality of inserts, which consists in positioning a plurality of sections of partially cured composition provided with a plurality of aligned apertures to form a charge of a certain volume in a molding position with the inserts in the apertures of the charge, securing the inserts from longitudinal and lateral displacement from a predetermined position, and then molding the charge with the inserts supported therein into a unitary completely cured article of predetermined accurate dimensions and relationship of the inserts with the body portion and with each other.

6. The method of manufacturing telephone test strips, comprising a body portion of cured phenolic condensation product with a plurality of electrical conducting inserts, which consists in positioning a multiple apertured charge of partially cured condensation product in a molding position with the inserts in the apertures of the charge, securing the inserts from longitudinal and lateral displacement from a predetermined position, and then subjecting the condensation product to the action of heat and pressure to produce a unitary completely cured composite article of predetermined accurate dimensions and relationship of the inserts with the body portion and with each other, the pressure being applied longitudinally of the inserts.

7. In a molding apparatus, means providing a molding cavity, means for maintaining an insert in a predetermined position in the cavity, including a formation on a surface of the means providing the cavity cooperating with a surface on the insert, and pressure means for molding material inserted in the cavity and around the insert.

8. In a molding apparatus, means providing a molding cavity, means for maintaining an insert in a predetermined lateral and longitudinal position in the cavity, comprising a formation on a surface of the means providing the cavity cooperating with a surface on one end of the insert and pressure means engaging the opposite end of the insert, and pressure means for molding material inserted in the cavity and around the insert.

9. In a molding apparatus, means providing a molding cavity, means for maintaining a plurality of inserts in a predetermined position in the cavity, including a plurality of aligning members projecting from the floor of the cavity and fitting complementary depressions provided in the end surfaces of the inserts, and pressure means for molding material inserted in the cavity and around the inserts.

10. In a molding apparatus, means providing a molding cavity, means for maintaining a plurality of inserts in a predetermined position in the cavity, comprising a plurality of aligning members projecting from the floor of the cavity and fitting complementary depressions provided in the end surfaces of the inserts at one end thereof and a plurality of reciprocably mounted elements engaging the opposite end surfaces of the inserts, means reciprocably mounted in the cavity resting on the molding material inserted therein and surrounding the inserts for laterally supporting the last mentioned ends of the inserts, cooperating pressure means for molding the material in the cavity and around the inserts, one of the pressure means acting against the reciprocable means, and means operatively connected to the pressure means for exerting pressure upon the elements to firmly hold the inserts in a predetermined longitudinal position during the operation of the pressure means.

11. In a molding apparatus, means providing opposite walls of a molding cavity, means providing a floor and other opposite walls of the cavity disposed at an angle to the walls of the last mentioned means and insertable therein, means for maintaining an insert in a predetermined position in the cavity, including a formation on a surface of the means providing the cavity cooperating with a surface on the insert, and pressure means for molding material inserted in the cavity and around the insert.

12. In a molding apparatus, means providing opposite walls of a molding cavity, a U-shaped member insertable therein to complete the cavity, the last mentioned means having a formation on a surface forming the floor of the cavity for maintaining one end of an insert in a predetermined lateral position in the cavity, means reciprocably mounted in the cavity resting on the molding material inserted therein and surrounding the insert for laterally supporting the opposite end of the insert, and pressure means for molding the material in the cavity and around the insert, one of the pressure means acting against the reciprocable means.

13. In a molding apparatus, means providing a molding cavity, means for maintaining an insert in a predetermined position in the cavity, comprising complementary formations on a surface of the means providing the cavity and on the end surface of the insert and a reciprocably mounted element engaging the opposite end surface of the insert, pressure means for molding material inserted in the cavity and round the insert, and means for resiliently mounting the reciprocable element on the pressure means.

In witness whereof, I hereunto subscribe my name this 21st day of February, A. D. 1929.

GEORGE POLLOCK McGRAW.